United States Patent

Bradley

[15] 3,657,546

[45] Apr. 18, 1972

[54] LINE FOLLOWER EQUIPPED WITH MASK TO MAKE EDGE OF SILHOUETTE APPEAR AS A LINE

[72] Inventor: John R. Bradley, Chesham, England

[73] Assignee: The British Oxygen Company Limited, London, England

[22] Filed: Jan. 27, 1970

[21] Appl. No.: 6,236

[30] Foreign Application Priority Data

Feb. 3, 1969 England ....................5,689/69

[52] U.S. Cl. ....................250/202, 250/237

[51] Int. Cl. ....................G06k 11/02, H01j 3/14

[58] Field of Search ....................250/203, 237, 202

[56] References Cited

UNITED STATES PATENTS

| | | | |
|---|---|---|---|
| 3,229,075 | 1/1966 | Palti | 250/237 X |
| 3,441,735 | 4/1969 | King | 250/202 |

*Primary Examiner*—James W. Lawrence
*Assistant Examiner*—T. N. Grigsby
*Attorney*—Townshend and Meserole

[57] ABSTRACT

A photoelectric line follower is enabled to follow silhouette patterns by positioning a mask partially in the sight area of the follower. The mask blanks out a portion of the silhouette, leaving only an unobscured, linear portion to function as a 'virtual' line in guiding the follower.

9 Claims, 4 Drawing Figures

INVENTOR
JOHN R. BRADLEY
BY Townsend & Townsend
ATTORNEYS

INVENTOR
JOHN R. BRADLEY
BY Townsend & Meserole
ATTORNEYS

LINE FOLLOWER EQUIPPED WITH MASK TO MAKE EDGE OF SILHOUETTE APPEAR AS A LINE

This invention relates to line followers, by which is meant photoelectrically controlled apparatus for following a line so as to drive associated equipment along a path related to the path traced out by the line.

The line to be followed is usually provided by a specially drawn pattern. An alternative form of pattern is that of a silhouette of which the contrasting areas define a boundary which can be followed. Because of the different modes of operation a line follower cannot follow a boundary without adaptation.

The present invention aims at enabling a line follower to follow a boundary without adaptation of its circuitry, and accordingly provides a photoelectric line follower which is as claimed in the respective appended claims.

The present invention also provides a mask as claimed in the respective appended claims.

The invention will now be described by way of example with reference to the accompanying drawing, in which.

In a photoelectrically controlled line follower the photoelectric axis of the follower is adapted to oscillate transversely to the axis of the line being followed along a scanning path which is sufficiently long so that it extends for an appreciable distance into the lighter area on both sides of the line being followed. What normally happens is that the midpoint of the scanning path is centered over the line, and the scanning path is maintained perpendicular to the axis of the line by appropriate rotation of the line follower, and therefore of the scanning path, as the line follower is driven along the length of the line. The means by which the follower and associated equipment is driven, and the optical and electrical circuity of the follower, are in general known. As these details do not form part of the subject-matter of this application they are not discussed in further detail.

A line follower cannot be used to follow a boundary without adaptation because the signals obtained from the scanning process are not able to be interpreted successfully by the circuitry of the follower to produce the correct signals controlling operation of the follower.

The present invention aims at solving this problem by using a mask which, in cooperation with the boundary to be followed, defines a "virtual line" which the follower treats as a true line and follows accordingly. Because the mask is intended to move with the follower, it is as if the whole length of the edge were covered with a mask which is spaced from the boundary by a distance such that the spacing produces a virtual line.

The mask may take different forms, as discussed below, but the visually effective portion of the mask is intended to be positioned closely adjacent to the boundary being followed.

Figure 3:
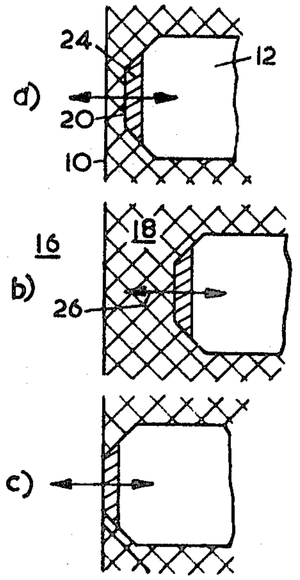
FIG. 3 is a view similar to FIGS. 1 and 2 but showing a third form of mask.
Figure 4:
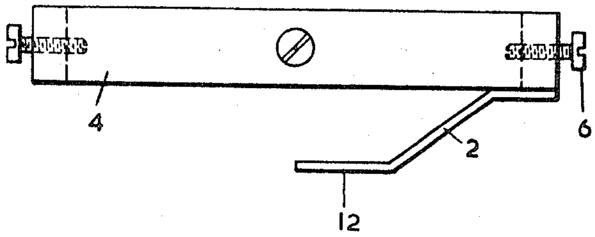
FIG. 4 is a diagrammatic side view of means for mounting a mask of the present invention in position on a line follower.

As shown in FIG. 4, the mask may take the form of a cranked finger 2 of a thin material. One end of the finger is secured to a ring 4 which is adapted to be detachably mounted on the lower rotatable part of a line follower (not shown), by means of fixing screws 6. The ring 4 may be of hollow cylindrical shape, or it may have an internal non-circular cross-section or is otherwise adapted so that is can be correctly oriented on a line follower so that the finger 2 is positioned above the darker area 8 (FIGS. 1 to 3) defining the boundary 10 being followed.

The lower portion 12 of the finger is intended to be close and parallel to the plane of the pattern. Portion 12 is intended to intersect the scanning path of the follower, which path is indicated by the line 14 in the other Figures of the drawing. The arrow heads at both ends of the line are intended to indicate the limits of the scanning path.

Figure 1:
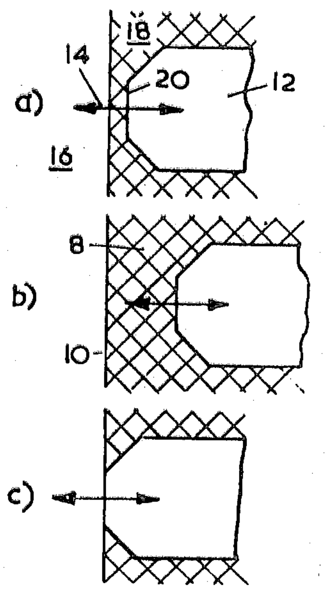
FIG. 1 shows three diagrammatic views of one form of mask of the present invention as seen by the line follower.

In the simplest form of the present invention, as shown in FIG. 1, portion 12 of the mask is a uniform white color. The boundary 10 intended to be followed is between a white area 16 and a black area 18. In practice neither the white nor the black area will be completely white or black, but as long as they are sufficiently contrasting, as viewed by the follower, such imperfections are acceptable.

The mask 12 may have a linear terminal edge 20 as illustrated, or the edge may be rounded. The linear edge 20 has the advantage that it defines with the boundary 10 being followed a thin rectangular area 22 which intersects the scanning path and which therefore looks to the line follower as if it were a line.

While theoretically this simple form of mask would work perfectly satisfactorily, in practice allowance has to be made for the fact that the follower cannot always follow the boundary 10 within narrow limits, and that there come times during operation of the follower when the scanning path becomes displaced by a substantial distance from the boundary 10. The diagrams (*b*) and (*c*) in FIGS. 1 to 3 show respectively the positions when the scanning path 14 has moved completely into the black area 18, and when it has moved towards the white area 16 to such an extent that the edge 20 becomes colinear with boundary 10.

When the apparatus reaches the position shown in FIG. 1(*b*) then operation of the line follower is straightforward, in that oscillation of the point of scan between the area 18 and the white portion 12 of the mask generates strong signals which cause the line follower to be driven back towards the boundary 10.

However a difficulty arises when the apparatus reaches the position shown in FIG. 1(*c*) in that because the area 18 is completely masked by area 12, the follower can "see" no black lines, so that it acts as if it were attempting to follow a non-existent line. The follower may stop or it may be caused to "hunt" for the line, according to its design, but in either case it no longer functions effectively as a line follower until the desired operating conditions are reestablished.

Figure 2:
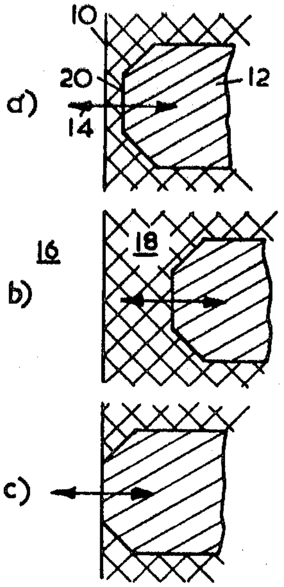
FIG. 2 is a view similar to FIG. 2 showing a second form of mask.

To overcome the disadvantages of the simple form of mask shown in FIG. 1, the mask shown in FIG. 2 can be used. In this the portion 12 of the mask is colored grey, by which is meant any color which to the photosensitive part of the follower presents a contrast between both the white and black areas of the boundary being followed. When the system is operating normally, as indicated in FIG. 2(*a*), then the scanning part includes the white area 16, the black zone 22, and the grey area 12. Although this gives rise to a distorted waveform compared with the waveform generated when using the mask of FIG. 1, this distortion is still acceptable in that it provides an effective balanced or "null" signal from which departures to one side or the other gives rise to "error" signals acting as feedback signals to cause the follower to return to its desired operating position relative to boundary 10. Thus, when the mask moves further into the black area 18 until it reaches the position illustrated in FIG. 2 (*b*), the grey area 12 offers sufficient contrast with the black area 18 for the required "error" signal to be generated. When the mask moves in the opposite direction until it reaches the position shown in FIG. 2(*c*), the contrast between the white area 16 and the grey area 12 is still sufficient to define an edge which the line follower is able to use to generate an "error" signal driving the follower back until the conditions shown in FIG. 2(*a*) are reestablished.

One practical difficulty in using the mask shown in FIG. 2 is to regulate the colour of the mask so that it functions as intended. Thus whatever the initial shade of grey or other color which the mask has initially, it would naturally tend to accumulate more dirt in use, thus reducing its contrast with the black area 18. In addition the area 18 might not be completely black, as when using elderly faded patterns. Also the "white" area 16 of some elderly patterns might similarly have accumulated sufficient dirt to reduce below an acceptable value the contrast which area 16 presents with mask 12.

The mask shown in FIG. 3 is intended to overcome this difficulty, in that it includes a white area 12 bordering a black area 24. In that form of mask shown in FIG. 3, the area 24 is in the shape of a trapezium including edge 20.

Line followers can follow most accurately a line of an optimum thickness, e.g., of about 0.020 in thick, although they can follow lines differing appreciably from this optimum thickness, e.g., lines ranging in width between about 0.010 in and 0.040 in. In the FIG. 3 embodiment the width of area 24 perpendicular to edge 20 is about 0.015 in. In addition the center of the scan path is arranged to be at the point 26 at which the path intersects the edge 20. Because of this positioning of the point 26, the apparatus in use tends to stabilize about the position shown in FIG. 3(*a*), in which the edge 20 is spaced from edge 10 by about the same distance as the thickness of area 24, i.e., by about 0.015 in, so that effectively the follower is following a line of 0.030 in in thickness, which it is normally perfectly capable of doing.

When the follower deviates to the position shown in FIG. 3(*b*), the scan path effectively includes a major proportion of black and a small proportion of white, generated by the area 12. The contrast afforded by the inner edge of area 24 with area 12 is sufficient to generate an "error" signal to drive the follower back to the position shown in FIG. 3(*a*).

When a deviation of the follower in the direction opposite to that shown in FIG. 3(*b*) occurs, to reach the position shown in FIG. 3(*c*), the follower acts as if it were following a line 0.015 in thick. This is arranged to produce an "error" signal in the sense which is appropriate to cause the follower to move in a direction to widen the effective thickness of the line being followed, so that the follower moves away from the edge 10 to again stabilise at the position shown in FIG. 3(*a*). This it is able to do because of the fact that the area 24 is displaced to one side of the point 26.

Although described principally in connection with using a line follower fitted with the mask of the present invention to follow a boundary, the follower when so fitted with the mask may also be used to follow lines. This may be particularly useful when the lines being followed are so thick that the follower could not follow them accurately unassisted, but of which one edge accurately traces out the desired path, for in this case the mask tends to blank off the inaccurate line edge, replacing it with the appropriate portion of the mask, so that the follower tends to follow the accurate edge of the line.

It will be appreciated that in all those forms of the invention which require the mid-point of the scanning path to be displaced from the edge 10 when the apparatus is in its operating position, the actual path covered by the follower would be displaced to one side of the edge 10 if no counter-measures were taken. This can be allowed for by using a kerf-width adjustment on the line follower so that the physical axis of rotation of the line follower is positioned over the edge 10, i.e., the optical axis of the follower (corresponding to point 26, FIG. 3) is displaced to one side of the rotational axis, as viewed in the direction of travel of the follower.

I claim:

1. A photoelectric line follower adapted to scan a boundary being followed, the scan being along a path which extends transversely to the direction of the boundary where it intersects the scanning path, and in which a mask movable with the follower is adapted to be positioned over the darker area defining the boundary, the mask having on it an area which is adapted to contrast with the said darker area and to intersect the scanning path so as to present to the follower a 'virtual' line formed by that portion of the darker area which extends along the scanning path between the boundary and the said contrasting area.

2. The line follower claimed in claim 1, in which the contrasting area of the mask presents to the line follower the appearance of the lighter area defining the boundary.

3. The follower claimed in claim 2, in which the mask presents to the line follower a darker area intermediate the said contrasting area and the boundary being followed.

4. The mask claimed in claim 1, in which the said contrasting area is of a colour intermediate the darker and lighter areas which define the boundary being followed.

5. The mask claimed in claim 1, in which the said contrasting area is contiguous with a darker area extending perpendicularly to the scanning path of the follower on which the mask is to be mounted, the darker area forming a 'virtual' line with an edge of the mask.

6. The line follower as claimed in claim 1, in which the said contrasting area contrasts with both the darker area and the lighter area which between them define the boundary.

7. The line follower claimed in claim 6, in which the said contrasting area is gray in color.

8. The line follower claimed in claim 1, in which the mask has an edge having a linear portion which extends perpendicularly to the scanning path of the follower.

9. The line follower claimed in claim 8, in which the midpoint of the scanning path is arranged substantially to lie on the said linear portion.

* * * * *